(12) United States Patent
Brockway

(10) Patent No.: US 8,052,228 B2
(45) Date of Patent: Nov. 8, 2011

(54) MOVABLE AXLE GUARD FOR A COMPACTOR WHEEL

(75) Inventor: Robert John Brockway, Plymouth, WI (US)

(73) Assignee: Terra Compactor Wheel Corp., Scottsboro, AL (US)

( * ) Notice: Subject to any disclaimer, the term of this patent is extended or adjusted under 35 U.S.C. 154(b) by 757 days.

(21) Appl. No.: 11/328,391

(22) Filed: Jan. 9, 2006

(65) Prior Publication Data

US 2006/0244311 A1 Nov. 2, 2006

Related U.S. Application Data

(60) Provisional application No. 60/675,249, filed on Apr. 27, 2005.

(51) Int. Cl.
*B60S 1/68* (2006.01)
(52) U.S. Cl. ........................................ 305/107; 305/100
(58) Field of Classification Search .................. 305/100, 305/107, 110, 115; 301/43, 45, 46, 47, 48, 301/49; 172/538, 540, 547, 554, 559, 606, 172/608, 610
See application file for complete search history.

(56) References Cited

U.S. PATENT DOCUMENTS

| | | | |
|---|---|---|---|
| 1,182,662 A * | 5/1916 | Eby | 305/7 |
| 1,305,303 A * | 6/1919 | Nelson | 301/48 |
| 3,340,783 A | 9/1967 | Edminster | |
| 4,530,620 A | 7/1985 | McCartney | |
| 5,209,050 A * | 5/1993 | Carrigan | 56/16.7 |
| 5,330,260 A * | 7/1994 | Freeman | 305/110 |
| 5,358,355 A | 10/1994 | Brockway | |
| D379,630 S | 6/1997 | Brockway | |
| 5,676,493 A | 10/1997 | Brockway | |
| 5,687,799 A * | 11/1997 | Greenfield et al. | 172/540 |
| 5,769,507 A | 6/1998 | Brockway | |
| 6,042,192 A | 3/2000 | Brockway | |
| 6,273,516 B1 | 8/2001 | Brockway | |
| 6,913,289 B2 | 7/2005 | Brockway | |
| 2004/0012244 A1 * | 1/2004 | Waterman et al. | 301/37.101 |
| 2005/0263976 A1 | 12/2005 | Brockway | |

* cited by examiner

*Primary Examiner* — Kip T Kotter
(74) *Attorney, Agent, or Firm* — Ziolkowski Patent Solutions Group, SC

(57) ABSTRACT

A compactor wheel is mountable on an axle of a compaction machine. The compactor wheel may comprise a hub mountable to an axle of a compaction machine; a rim mounted to the hub, the rim having a face; a plurality of compaction cleats mounted to the face of the rim; an axle guard movable relative to the rim during rotation of the compactor wheel; and structure for coupling the axle guard to at least one of the hub and the rim.

10 Claims, 5 Drawing Sheets

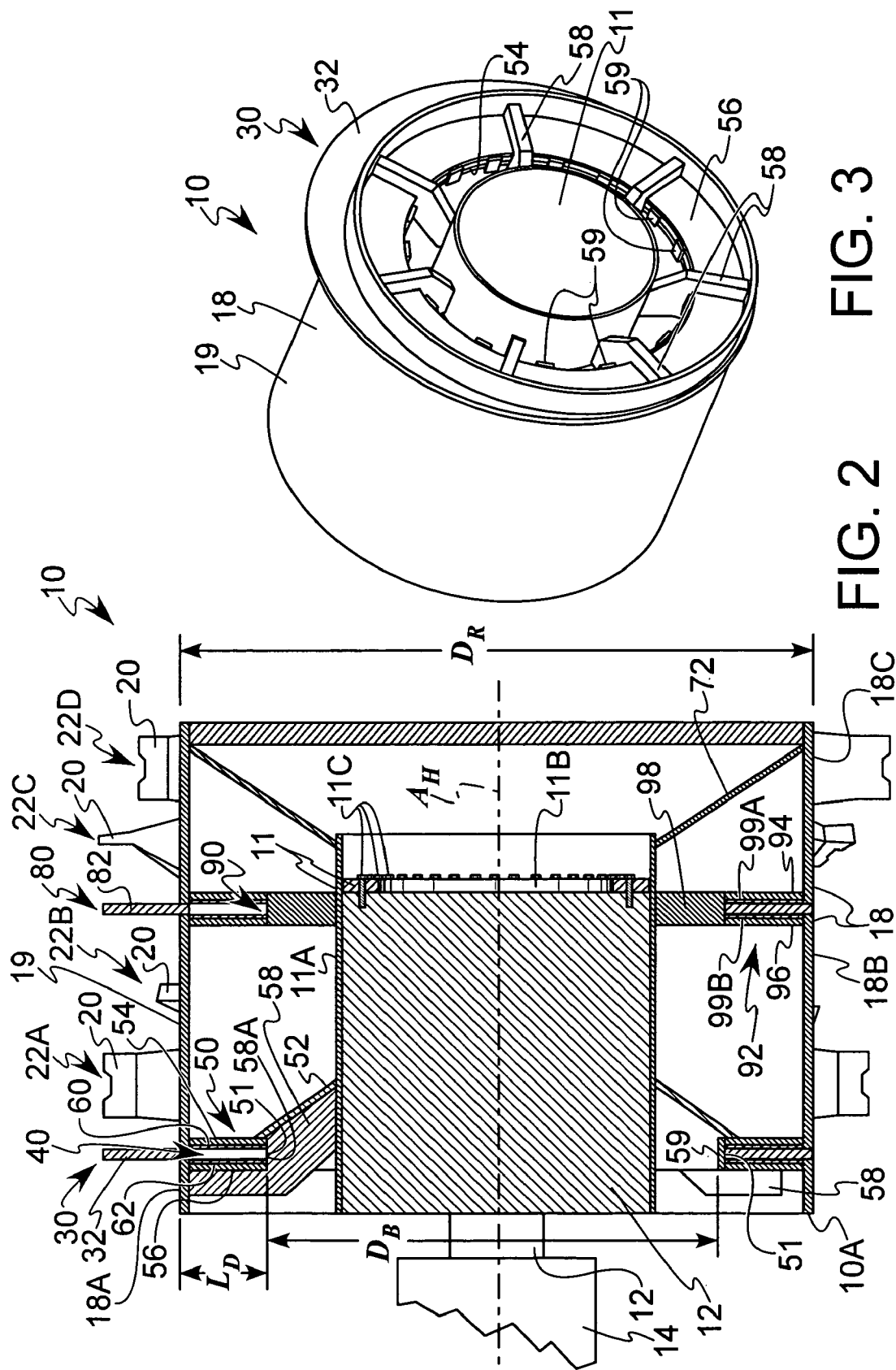

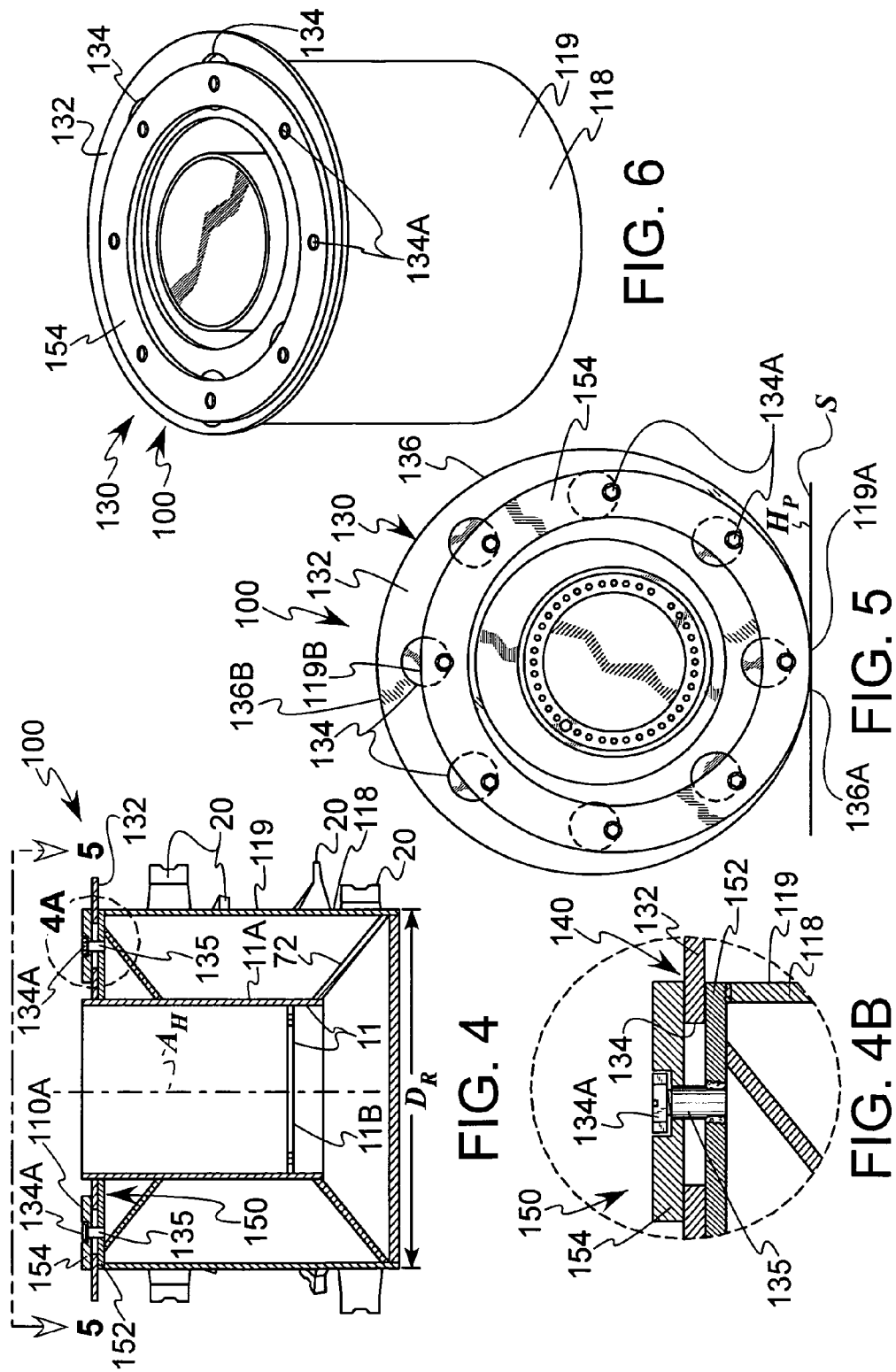

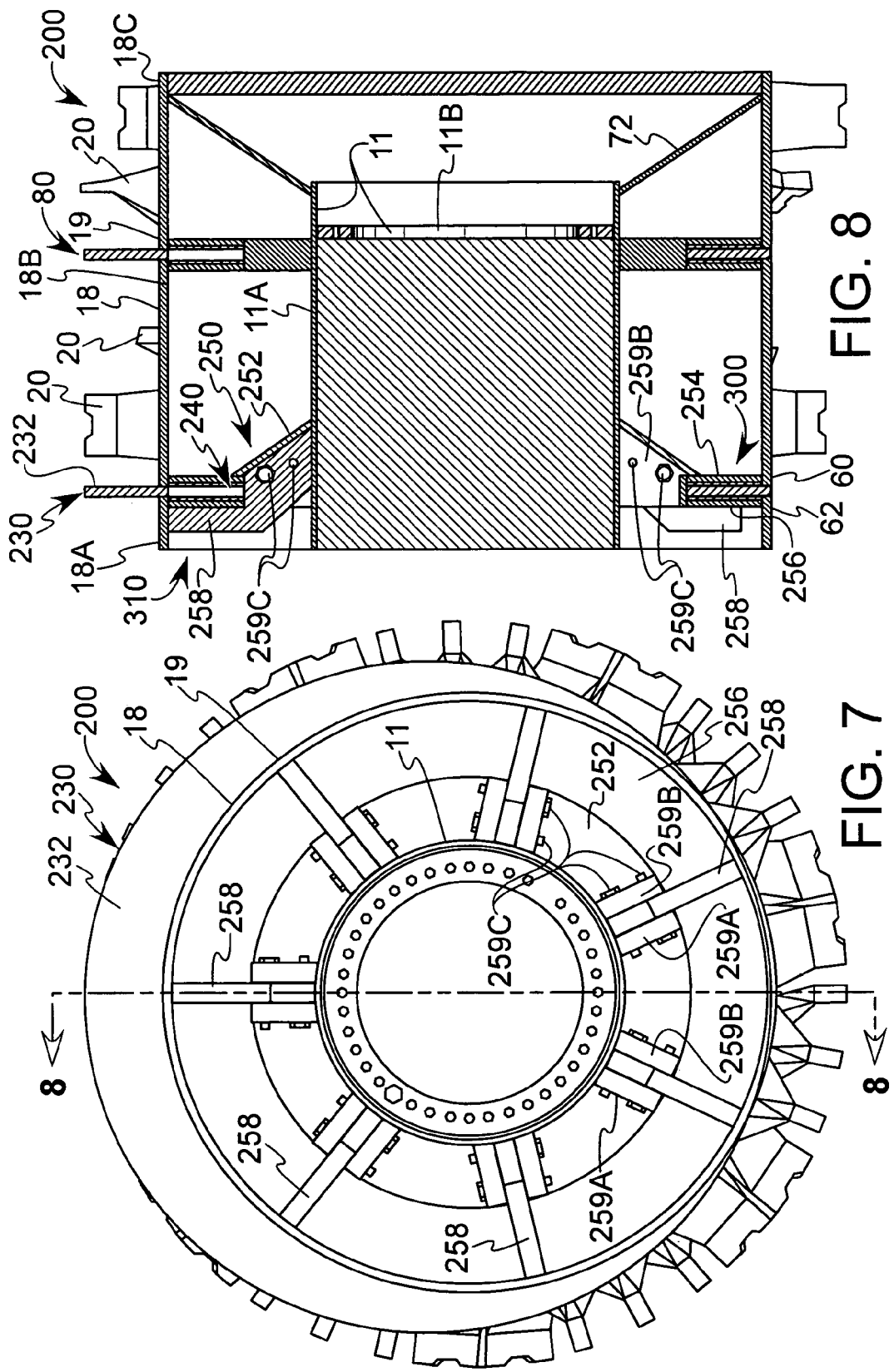

MOVABLE AXLE GUARD FOR A COMPACTOR WHEEL

RELATED APPLICATION

This application claims the benefit of U.S. Provisional Application No. 60/675,249, filed Apr. 27, 2005 and entitled "MOVABLE AXLE GUARD FOR A COMPACTOR WHEEL," the disclosure of which is incorporated herein by reference.

FIELD OF THE INVENTION

The present invention relates to compaction machines, such as those used to compact landfills, more particularly, to the compactor wheels on such a compaction machine and, even more particularly, to a compactor wheel having a movable axle guard.

BACKGROUND OF THE INVENTION

Compaction machines are used to compact landfill sites, garbage dumps and other such locations. These machines typically include a self-propelled vehicle having four large wheels made of steel. Each wheel has a hub mounted to one end of an axle and a rim disposed around and radially out from the hub. The rim typically includes a plurality of cleats mounted thereon. One problem encountered by such machines is the accumulation of waste behind the compaction wheel. Waste materials such as steel cable, wire, rope and the like have a particularly detrimental effect. Such refuse tends to wrap around the axles of the compaction machine and become trapped between the wheel and a side wall of the compaction machine, increasing the corresponding frictional forces therebetween. Increasing the friction between the wheel and the compaction machine increases the load on the wheel propulsion system (e.g., an internal combustion engine) and reduces the life of the compaction machine. In addition, such increased frictional forces can cause the compaction wheels to wear to the point of requiring repair or even replacement of the wheels. Such wear related repairs can be very costly, and replacement wheels are very expensive.

There is a need for an improved way to prevent, or at least substantially inhibit, cable, rope, wire and other refuse and debris from wrapping around the axle of a compaction machine.

SUMMARY OF THE INVENTION

In accordance with a first aspect of the present invention, a compactor wheel is provided mountable on an axle of a compaction machine. The compactor wheel comprises a hub mountable to an axle of a compaction machine; a rim mounted to the hub, the rim having a face; a plurality of compaction cleats mounted to the face of the rim; structure for defining a recess; and an axle guard positioned within the recess and being capable of moving within the recess during rotation of the compactor wheel.

The recess may be annular in shape.

The structure may include an inner base having a first dimension. The axle guard has an opening of a second dimension which is preferably greater than the first dimension.

The axle guard may comprise a ring-shaped plate having inner and outer diameters, where the inner diameter defines the second dimension.

The recess may have a depth equal to a third dimension and the inner diameter of the axle guard ring-shaped plate may be equal to or less than an outer diameter of the rim minus the third dimension.

The structure for defining a recess may comprise: a reinforcement member coupled to the hub; a plurality of gussets coupled to the hub; a first ring-shaped plate fixedly coupled to the reinforcement member; and a second ring-shaped plate spaced from the first plate. The gussets may be coupled to the hub by being bolted to side plates which are fixedly coupled to the hub. Alternatively, the gussets may be welded directly to the hub.

The rim has an outer diameter and the axle guard has an outer diameter which is greater than the rim outer diameter.

The axle guard may move within the recess in a direction generally transverse to a longitudinal axis of the hub.

Preferably, a first portion of an outer surface of the axle guard lies in a common horizontal plane with a first portion of the rim face when the rim face first portion is positioned directly adjacent to a surface along which the wheel moves and a second portion of the axle guard outer surface positioned diametrically opposed to the first portion of the axle guard outer surface is positioned above a second portion of the rim face positioned diametrically opposed to the first portion of the rim face.

The axle guard may be positioned near an inner edge of the rim.

The axle guard may be positioned between first and second circumferential rows of the compaction cleats, wherein the rows are transversely spaced apart from one another.

In accordance with a second aspect of the present invention, a compactor wheel mountable on an axle of a compaction machine is provided. The compactor wheel comprises: a hub mountable to an axle of a compaction machine; a rim mounted to the hub, the rim having a face; a plurality of compaction cleats mounted to the face of the rim; an axle guard movable relative to the rim during rotation of the compactor wheel; and structure for coupling the axle guard to at least one of the hub and the rim.

The coupling structure may comprise first and second plates defining a recess for receiving the axle guard and a plurality of pins extending between the plates and passing through corresponding openings in the axle guard.

The axle guard may comprises a ring-shaped plate having inner and outer diameters. The ring-shaped plate may include the axle guard openings, wherein each of the axle guard openings has a diameter which is substantially greater than an outer diameter of a corresponding pin such that the ring-shaped plate is capable of moving within the recess.

BRIEF DESCRIPTION OF THE DRAWINGS

FIG. 2 is a cross-sectional view of a compactor wheel including two movable guards constructed in accordance with a first embodiment of the present invention;

FIG. 3 is a perspective view of a compactor wheel including a single movable guard constructed in accordance with a first embodiment of the present invention;

FIG. 4 is a cross-sectional view of a compactor wheel including a movable axle guard constructed in accordance with a second embodiment of the present invention;

FIG. 4B is an enlarged view of structure defining a recess in which an axle guard ring shaped plate is provided in the compactor wheel illustrated in FIG. 4;

FIG. 5 is a side view of a compactor wheel including a movable guard constructed in accordance with a second embodiment of the present invention;

FIG. 6 is a perspective view of the compactor wheel of FIG. 4;

FIG. 7 is a side view of a compactor wheel including a movable guard constructed in accordance with a third embodiment of the present invention; and FIG. 8 is a cross-sectional view of a compactor wheel including a movable guard constructed in accordance with a third embodiment of the present invention.

DETAILED DESCRIPTION OF THE INVENTION

Figure 1:
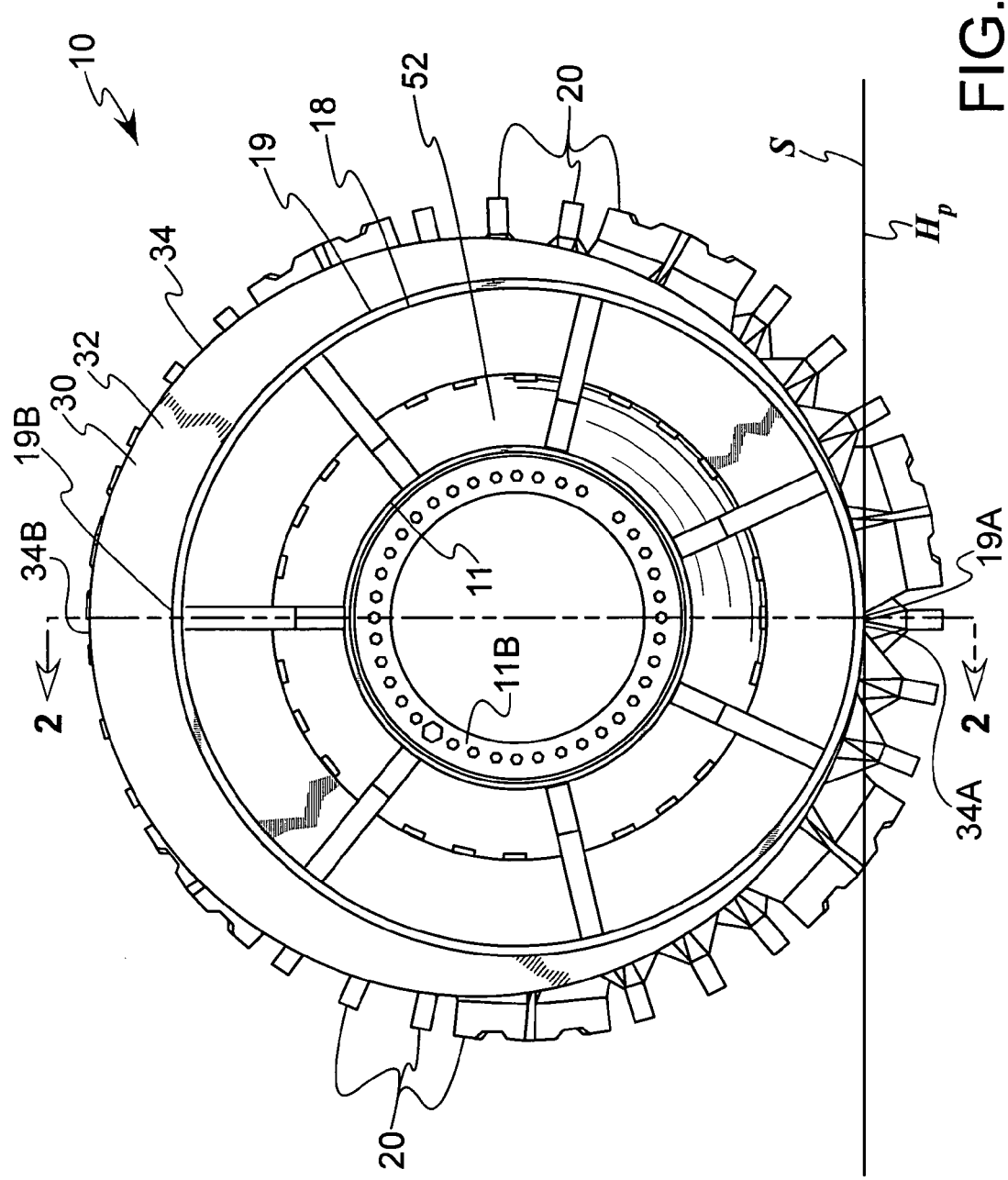
FIG. 1 is a side view of a compactor wheel including a movable axle guard constructed in accordance with a first embodiment of the present invention.

Although the present invention is herein described in terms of specific embodiments, it will be readily apparent to those skilled in this art that various modifications, rearrangements, and substitutions can be made without departing from the spirit of the invention. The scope of the present invention is thus only limited by the claims appended hereto.

Referring to FIG. 2, a compactor wheel 10 constructed in accordance with a first embodiment of the present invention is shown mounted on an axle 12 (the axle is not shown in FIGS. 1 and 3) of a compaction machine 14, such as those disclosed in U.S. Pat. Nos. 3,340,783; 4,530,620; and 5,358,355, which are incorporated by reference herein, in their entirety. The wheel 10 includes a hub 11 comprising a substantially cylindrical portion 11A and a ring-shaped plate 11B fixed within the cylindrical portion 11A and including a plurality of holes for receiving bolts 11C to allow the hub 11 to be coupled to the axle 12. A rim 18 having first, second and third sections 18A, 18B and 18C, respectively, is mounted around the hub 11. The rim 18 includes an outer face or surface 19 on which a plurality of cleats 20 (not shown in FIG. 3) are mounted, such as by welding or any other suitable technique.

An axle guard 30 is provided to form a barrier to help prevent cable, rope, wire and other refuse and debris from moving inward along the wheel 10 and subsequently wrapping around the axle 12 of the compaction machine 14, see FIG. 2. In the embodiment illustrated in FIGS. 1-3, the axle guard 30 comprises a first axle guard 30. As discussed more explicitly below, the axle guard 30 oscillates and, as such, also functions to knock or force off cable, rope, wire and the like which might be entangled or wrapped about one or more cleats 20. The axle guard 30 comprises a ring-shaped plate 32 having an inner diameter $D_I$, an outer diameter $D_O$ and a width $W_R$ equal to the outer diameter $D_O$ minus the inner diameter $D_I$, see FIG. 2A. The outer diameter $D_O$ of the ring-shaped plate 32 is larger than an outer diameter $D_R$ of the rim 18. The plate 32 is preferably formed from a metal, such as steel.

The axle guard 30 is located within an annular recess 40 defined by structure 50 forming part of the wheel 10, see FIG. 2. The recess 40 is preferably positioned near an inner edge 10A of the wheel 10, see FIG. 2. The recess 40 has a depth $L_D$ from the outer face 19 of the rim 18 which is equal to a third dimension. The structure 50 includes an inner base 51 having a diameter $D_B$. Preferably, the inner diameter $D_I$ of the axle guard ring-shaped plate 32 is greater than the diameter $D_B$ of the inner base 51 so as to allow the axle guard 30 to move, e.g., oscillate, within the recess 40 as the wheel 10 rotates on a surface S, see FIG. 1, such as a surface of a landfill. Hence, the axle guard 30 may move freely within the recess 40 in a direction generally transverse to a longitudinal axis $A_H$ of the hub 11, see FIG. 2. It is also preferred that:

$$D_I \leq D_R - L_D$$

$$W_R \leq L_D$$

where:

$D_I$=the inner diameter of the axle guard ring-shaped plate 32;

$D_R$=the outer diameter of the rim 18;

$W_R$=the width of the ring-shaped plate 32; and $L_D$=the third dimension or the depth of the recess 40.

Figure 2A:
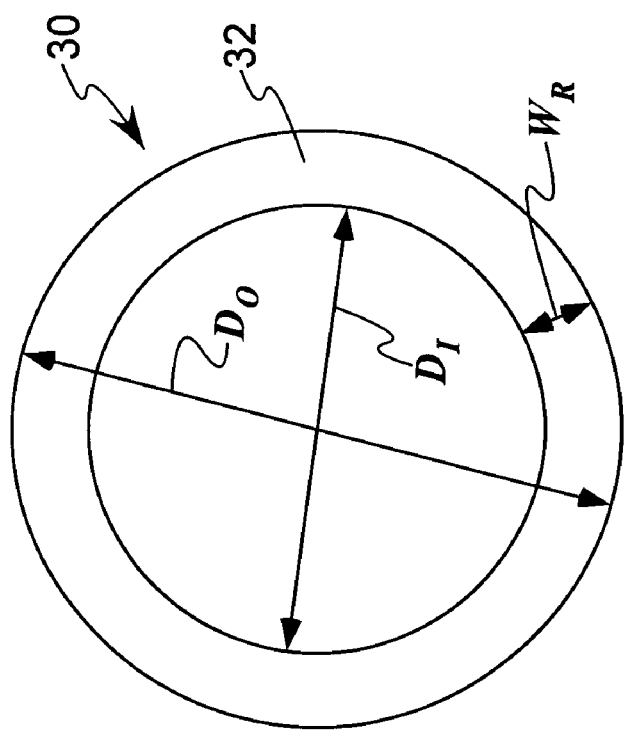
FIG. 2A is a side view of an axle guard ring shaped plate forming part of the wheel illustrated in FIG. 2.

Consequently, as the wheel 10 rotates along the surface S, a first portion 34A of an outer surface 34 of the axle guard 30 is positioned in a common horizontal plane $H_P$ with a first portion 19A of the rim face 19 when the rim face first portion 19A is positioned directly adjacent to the surface S, see FIG. 1. Also, a second portion 34B of the axle guard outer surface 34, positioned diametrically opposed to the first portion 34A of the axle guard outer surface 34, is positioned above, i.e., is spaced from, a second portion 19B of the rim face 19, which is positioned diametrically opposed to the first portion 19A of the rim face 19, see FIG. 1. Hence, as the wheel 10 rotates, the surface S will force the axle guard 32 upward such that the portion of the axle guard outer surface 34 located directly adjacent to the surface S, illustrated in FIG. 1 and described above as the first portion 34A, will preferably not extend beyond, i.e., below, the plane $H_P$ in which the portion of the rim face 19 positioned directly adjacent to the surface S, which portion is illustrated in FIG. 1 and described above as the first portion 19A, is located. Because the portion of the axle guard outer surface 34 located directly adjacent to the surface S does not extend beyond the rim face 19 in the illustrated embodiment, wear of the axle guard 30 at its outer surface 34 via contact with the surface S is substantially reduced.

The amount of the axle guard 30 extending beyond the rim face 19 varies, with the least amount being exposed at a six o'clock position, as viewed in FIG. 1, and the greatest amount being exposed at a twelve o'clock position. Hence, the greatest distance between a portion of the axle guard outer surface 34 and an adjacent portion of the rim face 19 occurs between the second portion 34B of the axle guard outer surface 34 and the second portion 19B of the rim face 19. The second portion 34B of the axle guard outer surface 34 may extends above the second portion 19B of the rim face 19 by an amount equal to about 0.1 to about 1.5 times the height of the largest cleat 20, i.e., the cleat 20 with the greatest height above the rim face 19.

The structure 50 defining the recess 40 comprises a first cone-shaped member 52, first and second ring-shaped plates 54 and 56, a plurality of gussets 58 and a plurality of coupling bars 59, all of which may be formed from a metal, such as steel. The first cone-shaped member 52 is weldably or otherwise fixedly coupled to the hub 11 and to the first ring-shaped reinforcement plate 54. The first ring-shaped reinforcement plate 54, in addition to being coupled to the cone-shaped member 52, is also coupled to the rim 18 and the coupling bars 59. The second ring-shaped plate 56 is spaced from the first plate 54, and fixedly coupled to the rim 18 and the plurality of coupling bars 59. The coupling bars 59 extend between and, as noted above, are coupled to the first and second plates 54 and 56. The coupling bars 59 and plate-receiving portions 58A of the gussets 58 define the innerbase 51. The gussets 58 are weldably coupled to the hub 11 and the rim 18 and may be coupled to one or both of the first and second plates 54 and 56. Positioned within the recess 40 on opposite sides of the axle guard 30 and adjacent to the first and second plates 54 and 56 are polymeric or abrasion-resistant metal rings 60 and 62, which function to prevent wear during movement of the axle guard 30 within the recess 40.

Further provided is a second cone-shaped member 72, which is weldably coupled between the hub 11 and the rim 18.

In the embodiment illustrated in FIG. 2, a second axle guard 80 is provided (not shown in FIGS. 1 and 3), which is formed from a ring-shaped plate 82 which is similar in shape and size to the ring-shaped plate 32 defining the first axle guard 30. The second axle guard 80 is positioned in a recess 90 defined by structure 92 comprising first and second ring shaped side plates 94 and 96 and a ring-shaped base plate 98, all of which may be formed from a metal. The side plates 94 and 96 are fixedly coupled respectively to the third and second sections 18C and 18B of the rim 18. The base plate 98 is fixedly coupled to the hub 11 and is fixedly coupled to the plates 94 and 96. Positioned within the recess 90 on opposite sides of the axle guard 80 and adjacent to the first and second plates 94 and 96 are polymeric or abrasion-resistant metal rings 99A and 99B, which function to prevent wear during movement of the axle guard 80 within the recess 90. The second axle guard 80 moves within its recess 90 in the same manner in which the first axle guard 30 moves within its recess 40.

In the illustrated embodiment, the cleats 20 are arranged in first, second, third and fourth circumferential rows 22A-22D, wherein the rows 22A-22D are spaced apart transversely. The second axle guard 80 is positioned between the second and third rows 22B and 22C of the cleats 20. The second axle guard 80 functions to remove or knock off cable, wire, rope, and the like which might be wrapped around or caught on an adjacent cleat 20. The second axle guard 80 also functions to remove dirt, rocks, and other debris which accumulates in the space between the rows 22B and 22C on opposite sides of the second axle guard 80.

While not illustrated in FIG. 2, one or more additional axle guards may be provided between the remaining rows of cleats, e.g., between the third and fourth rows 22C and 22D of cleats 20.

A compactor wheel 100 constructed in accordance with a second embodiment of the present invention is illustrated in FIGS. 4-6, where like reference numerals indicate like elements. The wheel 100 includes a hub 11 comprising a substantially cylindrical portion 11A and a ring-shaped plate 11B fixed within the cylindrical portion 11A and including a plurality of holes for receiving bolts (not shown in FIGS. 4-6) to allow the hub 11 to be secured to an axle (not shown in FIGS. 4-6). A rim 118 is mounted around the hub 11. The rim 118 includes an outer face or surface 119 on which a plurality of cleats 20 (only shown in FIG. 4) are mounted, such as by welding or any other suitable technique.

Figure 4A:
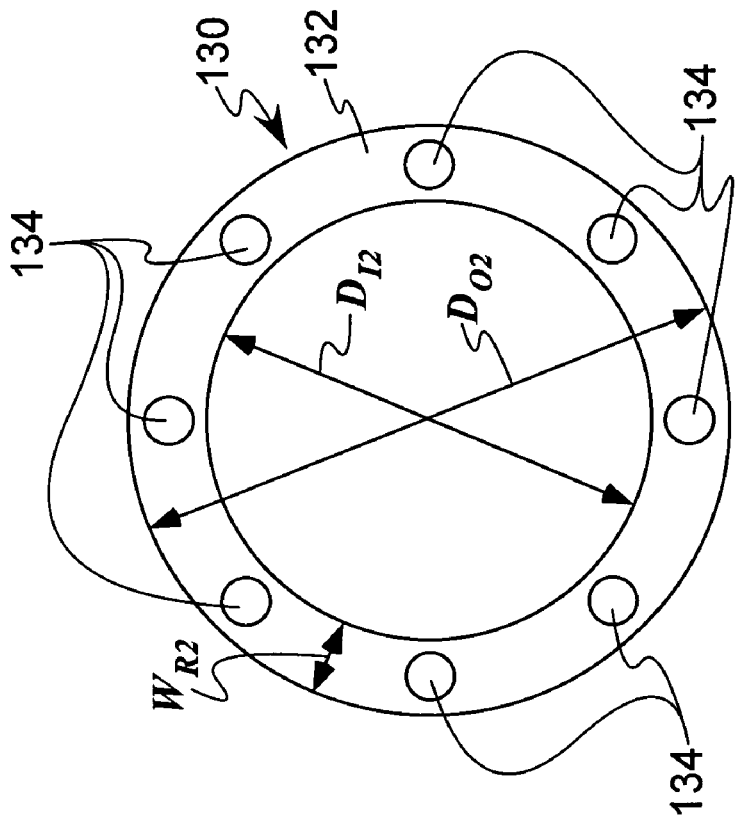
FIG. 4A is a side view of an axle guard ring shaped plate forming part of the wheel illustrated in FIG. 4.

In this embodiment, the axle guard 130 comprises a ring-shaped plate 132 having an inner diameter $D_{I2}$, an outer diameter $D_{O2}$ and a width $W_{R2}$ equal to the outer diameter $D_{O2}$ minus the inner diameter $D_{I2}$, see FIG. 4A. The outer diameter $D_{O2}$ of the ring-shaped plate 32 is larger than the outer diameter $D_R$ of the rim 118 mounted about the hub 11. The plate 132 includes a plurality of openings 134, which are adapted to receive pins 135, as discussed below. The plate 132 is preferably formed from a metal, such as steel.

The axle guard 130 is located within an annular recess 140 defined by structure 150 forming part of the wheel 10, see FIG. 4B. The recess 140 is positioned near an inner edge 110A of the wheel. The recess 140 is defined by first and second ring-shaped plates 152 and 154. The first plate 152 is weldably coupled to the rim 118. Extending from the first plate 152 are the pins 135, which are spaced apart from one another along an outer periphery of the first plate 152. The pins 135 are weldably or otherwise fixedly coupled to the first plate 152. The axle guard ring-shaped plate 132 is mounted adjacent to the first plate 152 such that the pins 135 extend through corresponding openings 134 in the plate 132. The second ring-shaped plate 154 is mounted over the axle guard ring-shaped plate 132 and coupled to the first plate 132 via bolts 134A which are threadedly received by the pins 135. While not shown in the FIG. 4, polymeric or abrasion-resistant plates may be positioned on opposing sides of the axle guard 130.

Preferably, the diameter of the openings 134 is larger than the diameter of the pins 135 so as to allow the axle guard 130 to move, e.g., oscillate, within the recess 140 as the wheel 100 rotates on a surface S, see FIG. 5. Hence, the axle guard 130 may move freely within the recess 140 in a direction generally transverse to a longitudinal axis $A_H$ of the hub 11, see FIG. 4. It is also preferred that the openings 134 and pins 135 be positioned and sized so that as the wheel 100 rotates along the surface S, the surface S will force the axle guard 130 upward such that a first portion 136A of an outer surface 136 of the axle guard 130 is positioned in a common horizontal plane $H_P$ with a first portion 119A of the rim face 119 when the rim face first portion 119A is positioned directly adjacent to the surface S.

The amount of the axle guard 130 extending beyond the rim face 119 varies, with the least amount being exposed at a six o'clock position, as viewed in FIG. 5, and the greatest amount being exposed at a twelve o'clock position. Hence, the greatest distance between a portion of the axle guard outer surface 136 and an adjacent portion of the rim face 119 occurs between a second portion 136B of the axle guard outer surface 136 and a second portion 1 19B of the rim face 119, which rim face second portion 119B is diametrically opposed to the rim face first portion 119A. The second portion 136B of the axle guard outer surface 136 may extends above the second portion 119B of the rim face 119 by an amount equal to about 0.1 to about 1.5 times the height of the largest cleat 20, i.e., the cleat 20 with the greatest height above the rim face 119.

A compactor wheel 200 constructed in accordance with a third embodiment of the present invention is illustrated in FIGS. 7 and 8, where like reference numerals indicate like elements. The wheel 200 includes a hub 11 comprising a substantially cylindrical portion 11A and a ring-shaped plate 11B fixed within the cylindrical portion 11A and including a plurality of holes for receiving bolts to allow the hub 11 to be secured to an axle (not shown in FIGS. 7 and 8). A rim 18 is mounted around the hub 11 and is constructed in generally the same manner as the rim 18 illustrated in the FIG. 2 embodiment. The rim 18 includes an outer face or surface 19 on which a plurality of cleats 20 are mounted, such as by welding or any other suitable technique.

An axle guard 230 is provided which functions in a similar manner to the axle guard 30 discussed above. The axle guard 230 is formed from a ring-shaped plate 232 which is similar in shape and size to the ring-shaped plate 32 defining the first axle guard 30. The axle guard 230 is positioned in a recess 240. The structure 250 defining the recess 240 comprises a first cone-shaped member 252, first and second ring-shaped reinforcement plates 254 and 256, a plurality of gussets 258 and pairs of first and second reinforcement side plates 259A and 259B, all of which may be formed from a metal, such as steel. The first and second side plates 259A and 259B are weldably coupled to the hub 11 and the first cone-shaped member 252. The first cone-shaped member 252, in addition to being coupled to the side plates 259A and 259B, is also fixedly coupled to the hub 11 and to the first ring-shaped reinforcement plate 254. The first ring-shaped reinforcement plate 254, in addition to being coupled to the cone-shaped member 252, is also coupled to the rim second section 18B and may be coupled to the side plates 259A and 259B. The hub 11, rim second section 18B, side plates 259A and 259B, member 252 and plate 254 define a first assembly 300.

The second ring-shaped plate 256 is fixedly coupled to the gussets 258 and the rim first section 18A. The gussets 58, in addition to being coupled to the plate 256, are also coupled to the rim first section 18A. The second ring-shaped plate 256, the gussets 258 and the rim first section 18A define a second assembly 310.

Positioned within the recess 240 on opposite sides of the axle guard 230 and adjacent to the first and second plates 254 and 256 are first and second polymeric or abrasion-resistant metal rings 60 and 62, which function to prevent wear during movement of the axle guard 230 within the recess 240.

The first and second assemblies 300 and 310, the axle guard 230 and the rings 60 and 62 are assembled as follows. The first ring 60 is positioned adjacent to the first reinforcement plate 254. The axle guard 230 is then positioned adjacent to the first ring 60 with the second ring 62 being placed adjacent to the axle guard 230 on a side opposite to the side positioned adjacent to the ring 60. Thereafter, the second assembly 310 is positioned adjacent to the first assembly 300 such that the second reinforcement plate 256 is positioned adjacent to the second ring 62. Bolts 259C are passed through the first and second side plates 259A and 259B and the gussets 258 to secure the first and second assemblies 300 and 310 together.

The axle guard 230 moves within its recess 240 in the same manner in which the first axle guard 30 moves within its recess 40.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A compactor wheel mountable on an axle of a compaction machine, said compactor wheel comprising:
    a hub mountable to an axle of a compaction machine;
    a rim mounted to said hub, said rim having a face;
    a plurality of compaction cleats mounted to said face of said rim;
    a structure for defining a recess formed in the rim, the structure including a first ring-shaped reinforcement plate and a second ring-shaped reinforcement plate spaced from said first plate; and
    an axle guard positioned within said recess and movable within said recess during rotation of said compactor wheel;
    wherein said structure for defining a recess further comprises:
        a reinforcement member coupled to said hub and to said first ring-shaped reinforcement plate; and
        a plurality of gussets coupled to said hub.

2. A compactor wheel as set out in claim 1 further comprising a pair of abrasion-resistant rings positioned in the recess and configured to prevent wear during movement of said axle guard within said structure.

3. A compactor wheel mountable on an axle of a compaction machine, said compactor wheel comprising:
    a hub mountable to an axle of a compaction machine;
    a rim mounted to said hub, said rim having a face;
    a plurality of compaction cleats mounted to said face of said rim;
    a structure for defining a recess in the rim; and
    an axle guard positioned within said recess and being capable of moving within said recess during rotation of said compactor wheel;
    wherein said structure includes an inner base having a first dimension and said axle guard has an opening of a second dimension which is greater than said first dimension;
    wherein said axle guard comprises a ring-shaped plate having inner and outer diameters, with said inner diameter defining said second dimension;
    wherein said recess has a depth equal to a third dimension and said inner diameter of said axle guard ring-shaped plate is equal to or less than an outer diameter of said rim minus said third dimension; and
    wherein said structure for defining a recess comprises:
        a reinforcement member coupled to said hub;
        a plurality of gussets coupled to said hub;
        a first ring-shaped plate fixedly coupled to said reinforcement member; and
        a second ring-shaped plate spaced from said first plate.

4. A compactor wheel as set out in claim 3, wherein said recess is annular in shape.

5. A compactor wheel as set out in claim 3, wherein said structure further comprises side plates weldably coupled to said hub and said gussets being coupled to said hub by being bolted to one or more of said side plates.

6. A compactor wheel as set out in claim 3, wherein said rim has an outer diameter and said axle guard has an outer diameter which is greater than said rim outer diameter.

7. A compactor wheel as set out in claim 3, wherein said axle guard moves within said recess in a direction generally transverse to a longitudinal axis of said hub.

8. A compactor wheel as set out in claim 3, wherein a first portion of an outer surface of said axle guard lies in a common horizontal plane with a first portion of said rim face when said rim face first portion is positioned directly adjacent to a surface along which said wheel moves and a second portion of said axle guard outer surface positioned diametrically opposed to said first portion of said axle guard outer surface is positioned above a second portion of said rim face positioned diametrically opposed to said first portion of said rim face.

9. A compactor wheel as set out in claim 3, wherein said axle guard is positioned near an inner edge of said wheel.

10. A compactor wheel as set out in claim 3, wherein said axle guard is positioned between a first circumferential row of compaction cleats and a second circumferential row of compaction cleats, said rows being transversely spaced apart from one another.

* * * * *